Nov. 5, 1946.  A. L. THOMPSON  2,410,758
CARBURETOR
Filed July 20, 1942
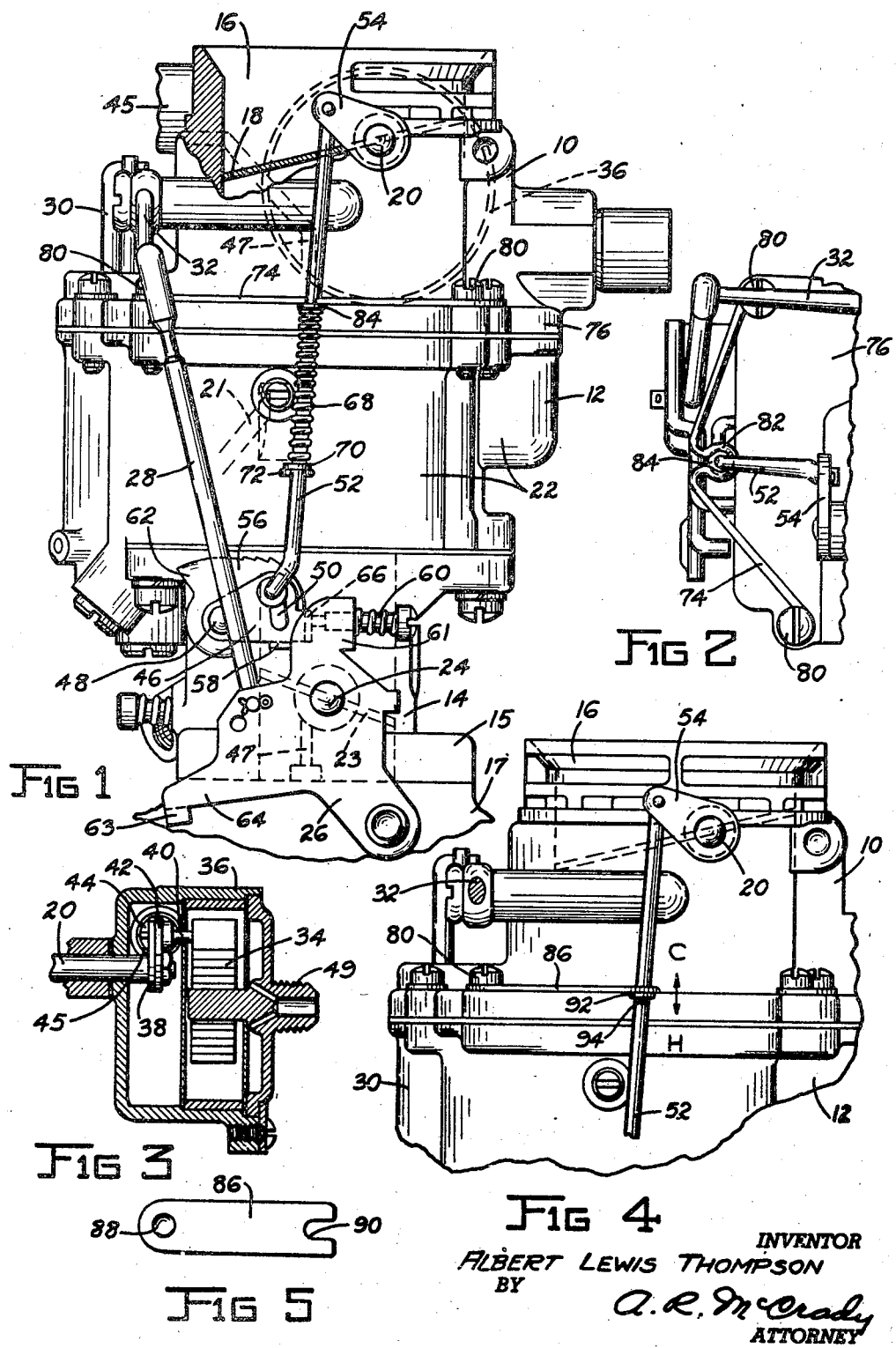
INVENTOR
ALBERT LEWIS THOMPSON
BY
A. R. McCrady
ATTORNEY Patented Nov. 5, 1946

2,410,758

UNITED STATES PATENT OFFICE 2,410,758

CARBURETOR

Albert L. Thompson, South Bend, Ind., assignor to Bendix Aviation Corporation, South Bend, Ind., a corporation of Delaware Application July 20, 1942, Serial No. 451,548

12 Claims. (Cl. 261—39)

This invention relates generally to carburetors for internal combustion engines and more particularly to means for controlling the air inlet or choke valves of carburetors.

Many present-day carburetors have means for automatically controlling the air inlet thereof, the said means generally being referred to as an automatic choke. Generally such means includes an air inlet or choke valve openable by suction in the induction passage of the carburetor, a temperature responsive device controlling the valve, and a piston responsive to vacuum posterior to the throttle valve and adapted to urge the choke valve toward open position in opposition to the thermostat. The choke valve in such automatic choke equipped carburetors is usually of the unbalanced butterfly type pivoted in the air inlet, and the temperature responsive device, usually a coiled bimetallic thermostatic spring, either directly attached to the choke shaft or disposed immediately adjacent thereto, is so arranged that it closes the valve at low engine temperatures and opens or permits the valve to open as the engine temperature rises to normal, said thermostat being intended to control and position the choke valve in accordance with engine temperature.

However, in downdraft carburetor constructions the air inlet and choke valve are arranged at the upper end of the carburetor and when the thermostatic coil is arranged in the above described manner it is located some distance from the engine. Therefore when the engine is stopped the rate of cooling of the coil and adjacent structure will be considerably higher than that of the engine, due to the much greater mass of the latter and the remote disposition of the thermostat with respect thereto. Consequently, during the cooling period, the thermostat does not control the choke valve in accordance with engine temperature and difficulty will be experienced during this period in again starting and/or operating the engine, particularly when the choke valve is positioned by the thermostat within a range of movement from the closed to a predetermined partly open position. This is due to the fact that within said range the choke valve has a greater effect on the air to fuel ratio than when the valve is opened beyond said predetermined partly open position.

It will be understood of course that there are various conditions under which the foregoing trouble or fault is encountered and in some instances the trouble will be particularly serious as, for example, when a cold engine is started and warmed up to its normal operating temperature and then stopped and allowed to cool for a limited time. Inasmuch as the temperature of the thermostat drops more rapidly than that of the engine during the cooling down period the thermostat, after a short interval of time, will move the choke valve to a position which will result in the delivery of a fuel mixture that is too rich for proper running of the comparatively warm engine if cranked at this time. Further, during this cooling down period, a critical point is reached at which the difference in the temperature of the thermostat and that of the engine is at a maximum and the closing force of the thermostat then may be so great that the choke valve will produce a mixture so rich that the engine will be flooded when it is cranked. But even if the difference in the temperature of the thermostat and the engine is not so extreme as to cause such flooding of the engine that it will not start upon being cranked, said engine will not run satisfactorily until the thermostat is warmed to substantially engine temperature and controls the position of the choke valve in accordance therewith.

It has been found that the above described difficulty cannot be satisfactorily overcome by adjusting the thermostat so that its normal closing force is reduced, due to the fact that it is desirable to have the thermostat exert a relatively strong closing force on the choke valve when the engine is started cold and also to control the opening of the valve in the usual manner as the latter approaches its open position.

It is, therefore, an important object of the present invention to provide means for automatically controlling the carburetor air inlet which will satisfactorily overcome this difficulty and which will effect improvement in the operation of the carburetor without materially affecting starting of the engine when cold.

Another object of the invention is to provide yielding or resilient means of suitable character for modifying the action of the thermostat by exerting a force in opposition to the closing force of said thermostat whereby the foregoing difficulty is obviated, said means being adapted to be effective when the choke valve is in a position less than a predetermined partly open position.

Still another object of the invention is to provide a device of this character wherein said means comprises a spring.

A further object of the invention is to provide a device of this character wherein the spring is responsive to engine temperature.

A still further object is to provide a device of this character wherein the temperature responsive spring is disposed nearer to the engine than the usual automatic choke thermostat.

Still further objects of the invention are to provide an effective device of this character that is simple in construction and operation and that is relatively inexpensive to manufacture.

Other objects and advantages of the invention will be apparent from the following description, taken in connection with the accompanying drawing, in which:

Figure 1 is a side elevation of an automatic choke carburetor embodying the invention;

Figure 2 is a partial plan view of same;

Figure 3 is a vertical section through the thermostat case;

Figure 4 is a partial side elevation of a carburetor equipped with a modified embodiment of the invention; and Figure 5 is a plan view of the bimetallic spring of the embodiment shown in Figure 4.

Throughout the drawing, similar reference characters represent similar parts although where such parts are modified in structure and operation, they are given further differing reference characters.

Referring now to Figures 1 and 2 there is shown a carburetor having an air horn section 10, a main body section 12, and a throttle body section 14 having a flange 15 for attachment of the carburetor to the intake manifold 17 of an internal combustion engine. An induction passage extends through the carburetor and includes an air entrance passage 16 controlled by the usual offset choke valve 18 mounted on a rotatable shaft 20. Fuel is delivered to the induction passage in the well-known manner by a fuel nozzle 21 receiving fuel from a fuel reservoir 22 and a throttle valve 23, mounted on a throttle shaft 24, is provided in the throttle body section for controlling the flow of mixture to the engine in the known manner.

A throttle lever 26 is mounted on the throttle shaft 24 and is arranged to be connected in the usual manner with the accelerator pedal, not shown. Lever 26 may be of the general shape shown in Figure 1, and is connected by the usual link 28 with the acceleration pump 30 through a pivoted arm 32.

The usual automatic control mechanism of the choke valve comprises a thermostat 34 mounted in a case 36 secured to the air horn section of the carburetor and into which one end of the choke shaft 20 extends. Said end of shaft 20 has a lever 38 rigidly attached thereto and a pin 40 is fixed to said lever adjacent the free end thereof. The pin 40 is engageable by the thermostat in the known manner and is connected by a link 42 to a vacuum piston 44 mounted in a cylinder 45 extending into the case 36. A duct 47 provides the usual suction connection between the outer end of the cylinder 45 and the induction passage posterior to the throttle valve 23 whereby the piston 44 is responsive to suction posterior to said valve 23. The thermostat is adapted to control at least the opening of the choke valve and the vacuum piston is adapted to modify the action of said thermostat, both the thermostat and the vacuum piston being adapted to function in accordance with well-known practice. A tube (not shown) leads from the tube fitting 49 to an exhaust heated stove of known design for transmitting heated air to the thermostat housing 36.

The carburetor has the usual fast idle arrangement which is shown as including a lever 46 rotatably mounted on a stud 48 fixed in the throttle body section 14 adjacent the throttle shaft. Lever 46 has a slot 50 in which is received one end of a link 52 which has its other end connected with a lever 54 rigidly attached to the end of the choke shaft opposite the lever 38. A fast idle cam 56 is also rotatably mounted on stud 48 and its clockwise rotation, as shown in the drawing, is limited by a finger 58 integral with lever 46 and which is turned beneath the lower edge of said cam, the latter having the usual eccentric portion engageable by a stop screw 60 secured to an arm 61 of the throttle lever 26. The cam 56 is also provided with an arm 62 engageable by a lug 63 on an extension 64 of the throttle lever whereby the choke valve may be forced at least partially open, in the known manner, to overcome a flooded condition of the engine should such condition occur when the thermostat is cold.

The slot 50 is provided in lever 46 to permit limited opening movement of the choke when said lever is held against movement by engagement of screw 60 with an ear 66 of said lever, said ear, when engaged by screw 60, being adapted to hold the throttle valve open a limited amount to provide sufficient fuel mixture for cold idling of the engine. This arrangement is well known and is of importance primarily when the engine is cold. Thereafter, when the coke valve is partly open it is not required and is generally inoperative.

In order to modify the action of the thermostat, calibrated resilient means is provided for urging the choke valve toward open position in opposition to the choke valve closing force of the thermostat and as shown in the drawing said means comprises an auxiliary spring 68 disposed about the link 52. One end of the spring 68 reacts against a washer 70 held against downward movement on the link by a pin 72 fixed in said link and the other end of said spring reacts against a member 74. The latter is shown as comprising a wire of suitable rigidity although said member may be of sheet metal or the like if desired.

Preferably the member 74 is formed as shown in Figure 2 and is secured adjacent its ends to the top side of cover 76 of the carburetor float chamber 22 by respective screws 80. The member 74 includes an eye 82 intermediate its ends which extends outwardly of the vertical plane of the adjacent float chamber wall and slidably receives the link 52 therein. If desired a washer 84, slidable on the link, may be provided between the eye 82 and the adjacent end of spring 68.

Operation of the device

It will be assumed that an engine having an automatic choke equipped carburetor embodying the present invention has been started cold, run a short time, stopped and allowed to cool. As the temperature of the thermostat drops faster than the engine, there will soon be an appreciable difference between the temperature of the thermostat and the temperature of the engine so that the setting of the choke valve will be such that the carburetor will deliver too rich a fuel mixture for proper operation of the comparatively warm engine if restarted at this time and if the difference between the thermostat temperature and engine temperature is extreme, cranking the engine will result in a flooded condition thereof which will prevent its starting.

The difficulty is overcome by spring 68 which opposes the closing force of the thermostat with sufficient force so that adequate opening of the choke valve will be effected by suction in the carburetor induction passage to provide enough air for a mixture having the proportions of air and fuel required for operation of the engine under the temperature conditions thereof then prevailing.

It is to be understood, however, that after the choke valve is opened beyond the said predetermined partly open position it is no longer desirable for the spring 68 to modify the action of the thermostat and said spring is then preferably rendered inoperative.

Various means may be used for rendering the spring 68 inoperative when the choke valve has been opened to said predetermined position. In the present instance, in order to effect this result, spring 68 is of such character that it will expand but a limited predetermined amount so that when the choke valve has opened to the point whereat the action of the spring is no longer desirable said spring has reached its limit of expansion. Thereafter, as the choke valve opens further the upper end of the spring moves away from the member 74 and the spring will be carried downwardly with the link 52.

It is also to be understood that spring 68 is so calibrated that its modifying action relative to the thermostat will not prevent suitable closing of the choke valve by said thermostat for normal cold engine starting when the temperature thereof is relatively low.

A modification of the invention is shown in Figures 4 and 5 and comprises an auxiliary spring which is temperature responsive such as a bimetallic thermostat element or strip 86 which is preferably positioned nearer the engine than the thermostat 34. One end of the strip 86 is provided with a hole 88 in which is received a screw 80 whereby said strip is secured to the carburetor float chamber cover 76. A notch 90, in which link 52 is slidably received, is provided in the free end of the strip 86 which is adapted to exert downward pressure on link 52 through a washer 92 and pin 94 fixed in said link and said strip 86 is of such character that its free end tends to move downwardly when the strip is heated and to move in the opposite direction as the strip cools, as indicated by the arrows H and C respectively in Figure 4.

Thus when the engine has been operated a short time and then stopped and allowed to stand until it has partly cooled, the thermostat strip 86, which is closer to the engine than thermostat 34, will be kept warmer by said engine than thermostat 34. As the temperature of the latter is substantially below that of the engine it exerts an abnormal closing force on the choke valve. However the warmer thermostat 86 opposes the closing force of the thermostat 34 with sufficient force to substantially nullify the abnormal force of said thermostat 34 so that when the engine is started the position of the choke valve will be substantially that required to provide the proper air-fuel mixture required by the engine at its prevailing temperature. Then as the engine further warms up with continued operation thereof, and the temperature of the thermostat 34 is substantially increased by the exhaust heated air supplied through the fitting 49, the choke valve continues to open until it reaches a predetermined partly open position whereat the free end of the thermostatic element 86 has reached its downward limit of movement. Thereafter, upon further opening movement of the choke valve, the washer 92 will move away from the free end of the thermostat 86 which thereafter has no further effect on the action of the choke valve as long as said valve remains open beyond said predetermined partly open position.

Thus the present invention overcomes a serious starting trouble under the conditions above described and while the auxiliary spring opposes the action of the thermostat 34 it does not render the engine more difficult to start under cold starting conditions due to the fact that an engine will start leaner than it will run, and in addition, the acceleration pump charge, introduced when the throttle is opened to allow the choke valve to close preparatory to starting the engine, will supply an extra charge of fuel which will facilitate starting.

It is thought that the invention and many of its attendant advantages will be understood from the foregoing description and it will be apparent that many changes may be made in the form, construction and arrangement of the parts without departing from the spirit and scope of the invention or sacrificing all of its material advantages, the forms herein illustrated and described being merely for the purpose of disclosing several preferred embodiments of the invention.

I claim:

1. In a carburetor: an air inlet; an unbalanced choke valve controlling said inlet; a mixture outlet; a throttle shaft; a throttle valve on said shaft, for controlling the mixture outlet; a thermostat controlling the choke valve and adapted to close same when the temperature is low; a piston responsive to suction posterior to the throttle valve and adapted to modify the action of the thermostat; fast idle mechanism including a movable member; means connected with the throttle shaft and adapted to hold the movable member against movement when the throttle and choke valves are substantially closed; a lost motion connection between the choke valve and said movable member adapted to permit movement of the choke valve relative to said member when the latter is held against movement, said movement of the choke valve being positively limited to a predetermined range; and a spring tending to urge the choke valve toward open position whenever said choke valve is in a substantially closed position and the throttle is open beyond the idling position.

2. In a carburetor for an internal combustion engine having an air inlet controlled by a suction responsive choke valve: resilient temperature responsive means for controlling the choke valve, said means being adapted to close the choke valve when cold; and temperature responsive means tending to open the choke valve whenever said valve is adjacent its closed position.

3. The invention defined by claim 2 wherein the second mentioned temperature responsive means is adapted to be located substantially nearer to the engine than the first mentioned temperature responsive means.

4. In a carburetor for an internal combustion engine having an induction passage with an air entrance and a mixture outlet: a choke valve openable by suction in the induction passage; means responsive to suction and temperature for controlling the choke valve; and an auxiliary temperature responsive means urging the choke valve toward open position whenever the latter is substantially closed.

5. The invention defined by claim 4 wherein the valve opening force of the auxiliary temperature responsive means increases with an increase of temperature.

6. In a carburetor for an internal combustion engine having an induction passage with an air entrance: a choke valve controlling said air entrance and openable by suction in the induction passage posterior thereto; a thermostat controlling the choke valve and adapted to close said valve when cold; means enclosing said thermostat and adapted to receive therein gas which has been heated by a relatively hot portion of the engine; a second thermostat tending to open the choke valve whenever said valve is adjacent its closed position; said second thermostat being adapted to be located nearer to the engine than the first mentioned thermostat and adapted to increase the force tending to open the choke valve upon an increase in temperature.

7. In a carburetor for an internal combustion engine having an air inlet controlled by a suction responsive choke valve: resilient temperature responsive means for controlling the choke valve, said means being adapted to close said choke valve when cold; and weaker temperature responsive means tending to open the choke valve when it is adjacent its closed position, said second temperature responsive means being inoperative whenever the choke valve is open beyond a predetermined position.

8. The combination in an internal combustion engine carburetor having an air inlet and a mixture outlet controlled by a throttle valve: a choke valve controlling the air inlet and openable by a differential of pressure on opposite sides thereof; means responsive to temperature and suction for controlling the choke valve; and yielding means adapted to urge the choke valve toward open position whenever said valve is at least partially closed, said yielding means being effective when the throttle valve is open at least beyond the idling position.

9. In a carburetor for an internal combustion engine having an air inlet controlled by a suction responsive choke valve and a mixture outlet controlled by a throttle: temperature responsive means for closing the choke valve when said means is cold; and yielding means so constructed and arranged as to exert a force in a choke valve opening direction at all such times as the choke valve is within a range of movement from the closed to a predetermined partly open position and the throttle is open beyond the idling position.

10. In a carburetor for an internal combustion engine having an air inlet controlled by a suction responsive choke valve and a mixture outlet controlled by a throttle: resilient temperature responsive means for controlling the choke valve, said means being adapted to close the choke valve when cold; and a temperature responsive means tending to open the choke valve whenever said valve is adjacent its closed position and the throttle is opened beyond its idling position.

11. In a carburetor having a body: an air inlet; an unbalanced choke valve controlling said inlet; a mixture outlet; a throttle shaft; a throttle valve on said shaft for controlling the mixture outlet; a thermostat controlling the choke valve and adapted to close same when the temperature is low; a piston responsive to suction posterior to the throttle valve and adapted to modify the action of the thermostat; fast idle mechanism including a movable member; means connected with the throttle shaft and adapted to hold the movable member against movement when the throttle and choke valve are substantially closed; a lost-motion connection, including a rod, between the choke valve and said movable member, adapted to permit limited movement of the choke valve relative to said member when the latter is held against movement; and a temperature responsive spring adapted to act on the rod and tending to urge the choke valve toward open position whenever said valve is in a substantially closed position, said spring being effective at substantially any throttle position whenever the choke valve is in said substantially closed position.

12. In a carburetor having a body: an air inlet; an unbalanced choke valve controlling said inlet; a mixture outlet; a throttle shaft; a throttle valve on said shaft for controlling the mixture outlet; a thermostat controlling the choke valve and adapted to close same when the temperature is low; a piston responsive to suction posterior to the throttle valve and adapted to modify the action of the thermostat; fast idle mechanism including a movable member; means connected with the throttle shaft and adapted to hold the movable member against movement when the throttle and choke valve are substantially closed; a lost-motion connection, including a rod, between the choke valve and said movable member, adapted to permit limited movement of the choke valve relative to said member when the latter is held against movement, said rod having an abutment thereon; an abutment on said carburetor adjacent said rod; and a spring adapted to act on the rod and tending to urge the choke valve toward open position whenever said valve is in a substantially closed position, said spring being coiled about said rod and adapted to react between said abutments, and being of such length and characteristics that it will be inoperative when the choke valve is open beyond a predetermined position.

ALBERT L. THOMPSON.

DISCLAIMER 2,410,758.—*Albert L. Thompson*, South Bend, Ind. CARBURETOR. Patent dated Nov. 5, 1946. Disclaimer filed Aug. 29, 1947, by the assignee, *Bendix Aviation Corporation*.

Hereby disclaims claims 8 and 9 of said patent.

[*Official Gazette October 7, 1947.*]